No. 821,858. PATENTED MAY 29, 1906.
H. L. CHRISTIANSEN.
PNEUMATIC TIRE.
APPLICATION FILED MAY 24, 1905.
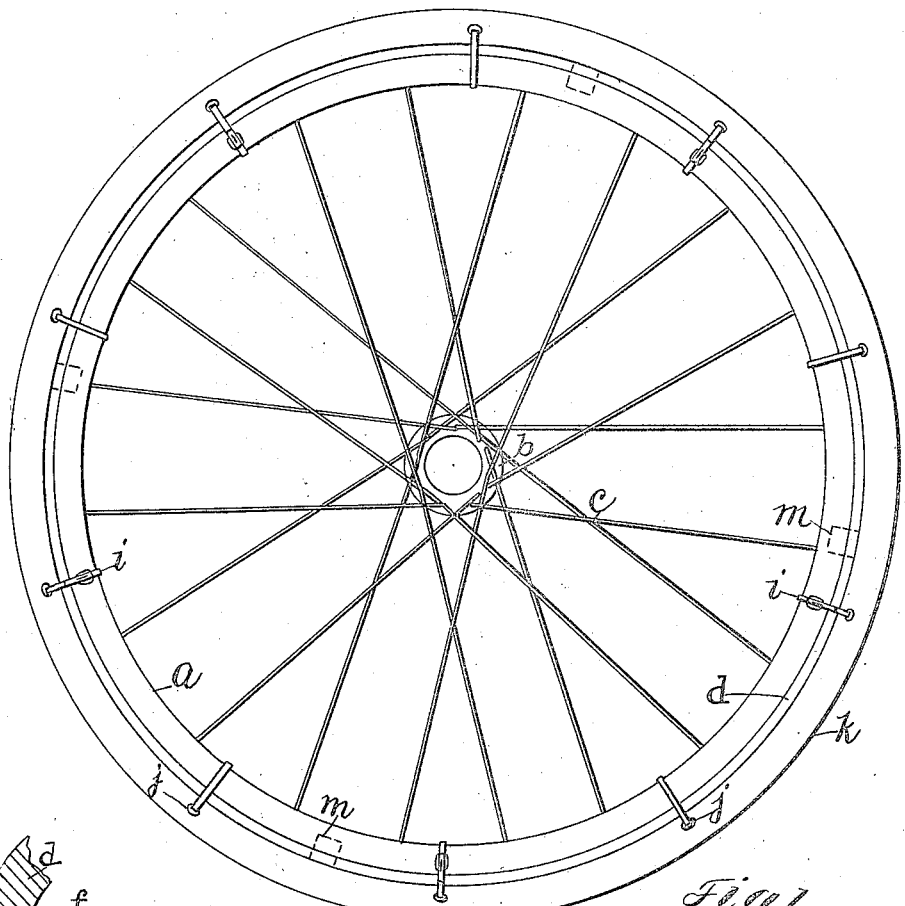
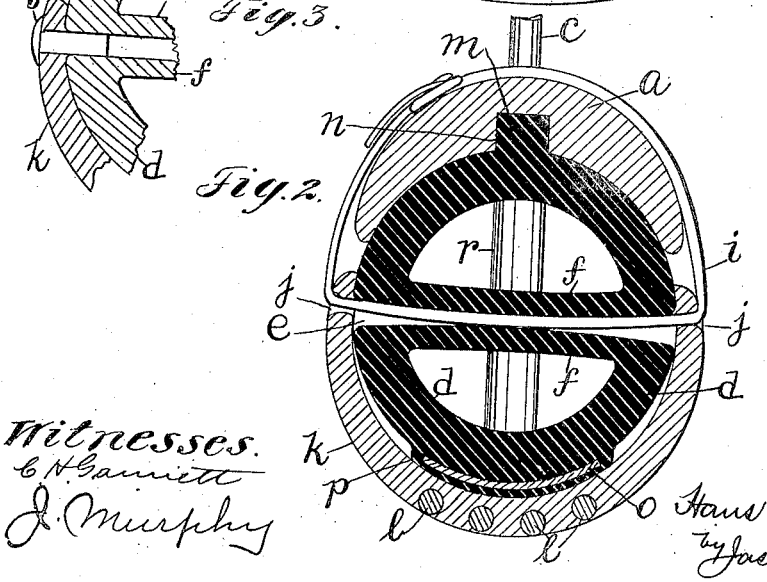
Witnesses.
C. H. Garrett
J. Murphy
Inventor:
Hans L. Christiansen
by Jas. H. Churchill
atty.

UNITED STATES PATENT OFFICE.

HANS L. CHRISTIANSEN, OF BOSTON, MASSACHUSETTS, ASSIGNOR OF ONE-THIRD TO HARALD TIDEMAND AND ONE-THIRD TO OLE WORM DAHL, BOTH OF BOSTON, MASSACHUSETTS.

PNEUMATIC TIRE.

No. 821,858.      Specification of Letters Patent.      Patented May 29, 1906.

Application filed May 24, 1905. Serial No. 261,933.

*To all whom it may concern:*

Be it known that I, HANS L. CHRISTIANSEN, a citizen of the United States, residing in Boston, in the county of Suffolk and State of Massachusetts, have invented an Improvement in Pneumatic Tires, of which the following description, in connection with the accompanying drawings, is a specification, like letters on the drawings representing like parts.

This invention relates to a pneumatic tire, and has for its object to provide a tire of novel construction, as will be described, which is especially adapted for use on the wheels of automobiles, bicycles, and like vehicles, whereby the pneumatic tire may be secured to the rim of the wheel without the use of cement.

In accordance with this invention the pneumatic tire is provided with a plurality of transversely-extended passage-ways, having their walls attached air-tight to the walls of the tire, and the walls of said passage-ways may be formed integral with the walls of the tire.

The tire may be secured to the rim of the wheel by lacings, cords, or straps, or like fastening devices, which are extended through the passage-ways and about the rim of the wheel. The lacings referred to may be passed through a shoe or protective covering for the tread of the tire, by which means said shoe is securely fastened in place.

The tire may be provided on its inner circumference with one or more projections or lugs, which extend into suitable sockets in the rim of the wheel and prevent creeping of the tire. The tread of the tire may be provided with a protective band or plate of sheet metal which is interposed between the shoe or covering and the tire and serves to protect the latter against puncture.

These and other features of this invention will be pointed out in the claims at the end of this specification.

Figure 1 is a side elevation of one form of wheel provided with a pneumatic tire embodying this invention; Fig. 2, a transverse section, on an enlarged scale, of the tire shown in Fig. 1; and Fig. 3, a modification to be referred to.

Referring to the drawings, *a* represents the rim, *b* the hub, and *c* the spokes, of a wheel provided with a pneumatic tire *d* embodying this invention. The tire *d*, of rubber or other suitable material, in accordance with this invention is provided with a plurality of passage-ways *e*, extended transversely of the tire and having its walls *f* attached to the walls of the tire, so as to form an air-tight connection therewith. The passage-ways *e* have extended through them lacings, straps, cords, or like fastening devices *i*, by means of which the tire may be detachably secured to the rim *a* of the wheel. The lacings *i* may also pass through suitable eyes or holes *j* in a shoe or covering *k*, of leather or other suitable material, which serves to protect the tire from wear. The tire *d* may be provided on its inner circumference with lugs or projections *m*, which enter sockets *n* on the inner circumference of the rim *a*, by means of which creeping of the tire on the rim is prevented. The shoe *k* may be provided with metal rods *l* at its tread portion to increase the wearing qualities of the shoe, and between the shoe and tire an armor *o* is interposed to prevent puncture. The armor *o* may be made in the form of a metal plate, band, or ribbon, which may be embedded in a thickened portion *p* of the tire, which thickened portion forms the tread of the tire. Additional tubes *r* may be extended substantially at right angles to the tubes *f*, if desired.

I may prefer to employ the lacings as a means for attaching the shoe to the tire; but I do not desire to limit my invention in this respect, as the shoe may be secured in place by means of buttons *s* extended through the shoe into the tubes *f*, (see Fig. 3,) or it may otherwise be secured to the tire.

From the above description it will be seen that the tire may be secured to the rim of the wheel in a minimum time and may be quickly detached therefrom, as it is not required to be cemented to the rim to retain it in place thereon, and convenient means are afforded for attaching the tire and its shoe to the rim of the wheel. The shoe *k* may be made of sufficient size to lap under the rim *a*, if so desired.

I claim—

1. The combination with a wheel, of a pneumatic tire therefor provided with transverse passage-ways, and lacings extended through said passage-ways and about the rim of the wheel for attaching the tire to the wheel, substantially as described.

2. The combination with a wheel, of a pneumatic tire therefor provided with transverse passage-ways, a shoe or covering for said tire, and means extended through said passage-ways and through said shoe for attaching the latter to the tire and the tire to the wheel, substantially as described.

3. The combination with a wheel, of a pneumatic tire therefor provided with transverse passage-ways, a shoe or covering for said tire, an armor interposed between said shoe and tire, and flexible means extended through said passage-ways for attaching the tire to said wheel.

4. The combination with a wheel having sockets on the inner circumference of its rim, a pneumatic tire having lugs or projections extended into said sockets, and provided with passage-ways extended through it, and flexible means extended through said passage-ways for attaching the tire to the said rim, substantially as described.

5. The combination with a wheel, of a pneumatic tire therefor provided with transverse passage-ways, a shoe or covering for said tire, and devices for attaching said shoe or covering to said tire, said devices being extended into the transverse passage-ways of said tire, substantially as described.

In testimony whereof I have signed my name to this specification in the presence of two subscribing witnesses.

HANS L. CHRISTIANSEN.

Witnesses:
  O. WORM DAHL,
  HARALD TIDEMAND.